(12) United States Patent
Lukanov et al.

(10) Patent No.: US 11,695,777 B2
(45) Date of Patent: Jul. 4, 2023

(54) HYBRID ACCESS CONTROL MODEL IN COMPUTER SYSTEMS

(71) Applicant: VMware, Inc., Palo Alto, CA (US)

(72) Inventors: Stanimir Lukanov, Sofia (BG); Georgi Lyubomirov Dimitrov, Sofia (BG); Hristo Hristov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 569 days.

(21) Appl. No.: 16/286,240

(22) Filed: Feb. 26, 2019

(65) Prior Publication Data

US 2020/0274881 A1    Aug. 27, 2020

(51) Int. Cl.
*H04L 9/40* (2022.01)
*G06F 21/62* (2013.01)
*G06F 21/60* (2013.01)

(52) U.S. Cl.
CPC .......... *H04L 63/105* (2013.01); *G06F 21/604* (2013.01); *G06F 21/6218* (2013.01);
(Continued)

(58) Field of Classification Search
CPC ... H04L 63/104; H04L 63/105; H04L 63/205; G06F 21/604; G06F 21/6218; G06F 2221/2141; G06F 2221/2145
(Continued)

(56) References Cited

U.S. PATENT DOCUMENTS 5,878,415 A * 3/1999 Olds ................... G06F 21/6218
6,023,765 A * 2/2000 Kuhn .................. G06F 21/6218
                                                    713/166
(Continued)

FOREIGN PATENT DOCUMENTS

CN      101325486 A  * 12/2008
WO      WO-02056138 A2  * 7/2002
WO      WO-2016129852 A1 * 8/2016  ............. G06F 21/51

OTHER PUBLICATIONS

Hildmann, Thomas, and Jörg Barholdt. "Managing trust between collaborating companies using outsourced role based access control." In Proceedings of the fourth ACM workshop on Role-based access control, pp. 105-111. 1999. (Year: 1999).*

(Continued)

*Primary Examiner* — Luu T Pham
*Assistant Examiner* — Walter J Malinowski
(74) *Attorney, Agent, or Firm* — Kim & Stewart LLP

(57) ABSTRACT

Techniques for providing hybrid access control in a cloud-services computing environment are provided. In one embodiment, a method for providing hybrid access control is provided at a host computing device. The method includes obtaining access control settings including at least a first user's role-based access settings with respect to a first sub-system of a hierarchical computing-resource system. The method further includes propagating the access control settings from the first sub-system to a second sub-system; obtaining user group domains assigned to a plurality of sub-systems; and obtaining a group membership associated with the first user. The method further includes determining, based on the obtained user group domains and the obtained group membership associated with the first user, whether the first user's role-based access settings propagated to the second sub-system are to be adjusted; and making adjustments accordingly.

23 Claims, 8 Drawing Sheets

(52) U.S. Cl.
CPC .......... *H04L 63/104* (2013.01); *H04L 63/205* (2013.01); *G06F 2221/2141* (2013.01); *G06F 2221/2145* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 6,044,466 | A * | 3/2000 | Anand | G06F 9/468 |
| | | | | 726/1 |
| 6,119,230 | A * | 9/2000 | Carter | G06F 21/34 |
| | | | | 726/5 |
| 6,330,567 | B1 * | 12/2001 | Chao | G06F 16/10 |
| | | | | 707/758 |
| 7,100,195 | B1 * | 8/2006 | Underwood | H04L 63/0823 |
| | | | | 707/999.009 |
| 7,185,192 | B1 * | 2/2007 | Kahn | G06F 21/6218 |
| | | | | 707/999.003 |
| 7,213,047 | B2 * | 5/2007 | Yeager | H04L 67/1046 |
| | | | | 726/4 |
| 7,591,007 | B2 * | 9/2009 | Hollberg | G06F 21/604 |
| | | | | 726/7 |
| 7,779,265 | B2 * | 8/2010 | Dubhashi | G06F 21/6218 |
| | | | | 713/182 |
| 8,156,537 | B2 * | 4/2012 | Gomez | G06F 21/6218 |
| | | | | 726/1 |
| 8,429,708 | B1 * | 4/2013 | Tandon | H04L 63/08 |
| | | | | 726/1 |
| 8,639,935 | B2 * | 1/2014 | Raleigh | G06Q 30/04 |
| | | | | 713/181 |
| 9,003,295 | B2 * | 4/2015 | Baschy | G06F 21/121 |
| | | | | 715/741 |
| 9,176,934 | B2 * | 11/2015 | Baschy | G06F 40/134 |
| 9,665,733 | B1 * | 5/2017 | Sills | H04L 63/102 |
| 9,774,586 | B1 * | 9/2017 | Roche | G06F 21/6218 |
| 9,864,752 | B2 * | 1/2018 | Lim | G06F 16/93 |
| 10,382,202 | B1 * | 8/2019 | Ohsie | H04L 63/0807 |
| 2002/0026592 | A1 * | 2/2002 | Gavrila | G06F 21/6218 |
| | | | | 726/6 |
| 2003/0188198 | A1 * | 10/2003 | Holdsworth | G06F 21/6218 |
| | | | | 726/1 |
| 2004/0088348 | A1 * | 5/2004 | Yeager | H04L 67/104 |
| | | | | 709/202 |
| 2005/0177377 | A1 * | 8/2005 | Wright | G06F 8/20 |
| | | | | 717/104 |
| 2006/0195449 | A1 * | 8/2006 | Hunter | G06F 21/6227 |
| 2006/0235985 | A1 * | 10/2006 | Ramkumar | H04L 67/12 |
| | | | | 709/229 |
| 2007/0043716 | A1 * | 2/2007 | Blewer | G06F 21/604 |
| 2007/0279671 | A1 * | 12/2007 | Shouno | G06F 21/629 |
| | | | | 358/1.14 |
| 2008/0098485 | A1 * | 4/2008 | Chiou | G06F 21/6218 |
| | | | | 726/27 |
| 2009/0007262 | A1 * | 1/2009 | Wallace | G06F 21/6218 |
| | | | | 726/21 |
| 2009/0019516 | A1 * | 1/2009 | Hammoutene | G06F 21/6245 |
| | | | | 726/1 |
| 2009/0028335 | A1 * | 1/2009 | van de Groenendaal | |
| | | | | H04W 12/033 |
| | | | | 380/274 |
| 2009/0100058 | A1 * | 4/2009 | Faitelson | G06F 21/6218 |
| 2009/0265353 | A1 * | 10/2009 | Vaddagiri | G06F 21/6218 |
| 2011/0022942 | A1 * | 1/2011 | Flemings | H04L 67/2804 |
| | | | | 715/230 |
| 2011/0296414 | A1 * | 12/2011 | Hinojosa | G06F 9/468 |
| | | | | 718/100 |
| 2011/0321159 | A1 * | 12/2011 | Nestler | G06F 21/6218 |
| | | | | 726/21 |
| 2012/0100852 | A1 * | 4/2012 | Horn | H04W 36/00837 |
| | | | | 455/436 |
| 2012/0173583 | A1 * | 7/2012 | Faiteson | G06F 21/6218 |
| | | | | 707/783 |
| 2012/0317207 | A1 * | 12/2012 | Eydelman | H04L 61/4511 |
| | | | | 709/206 |
| 2013/0091551 | A1 * | 4/2013 | Rajakarunanayake | |
| | | | | H04L 51/32 |
| | | | | 726/4 |
| 2013/0174274 | A1 * | 7/2013 | Friedman | G06F 21/6263 |
| | | | | 726/28 |
| 2013/0219176 | A1 * | 8/2013 | Akella | G06F 16/185 |
| | | | | 713/165 |
| 2013/0219456 | A1 * | 8/2013 | Sharma | H04L 9/0894 |
| | | | | 726/1 |
| 2014/0075004 | A1 * | 3/2014 | Van Dusen | G06F 16/90335 |
| | | | | 709/223 |
| 2014/0075501 | A1 * | 3/2014 | Srinivasan | H04L 63/104 |
| | | | | 726/1 |
| 2014/0164774 | A1 * | 6/2014 | Nord | G06F 9/00 |
| | | | | 713/171 |
| 2014/0177556 | A1 * | 6/2014 | Pan | H04L 1/0038 |
| | | | | 370/329 |
| 2015/0100503 | A1 * | 4/2015 | Lobo | G06Q 10/103 |
| | | | | 705/301 |
| 2015/0271208 | A1 * | 9/2015 | Gallant | H04L 9/3247 |
| | | | | 726/1 |
| 2015/0289234 | A1 * | 10/2015 | Zhao | H04L 1/0073 |
| | | | | 370/329 |
| 2016/0088068 | A1 * | 3/2016 | Toy | H04L 63/0272 |
| | | | | 709/219 |
| 2017/0060906 | A1 * | 3/2017 | Born | G06F 16/21 |
| 2017/0272449 | A1 * | 9/2017 | Gilpin | G06F 9/468 |
| 2018/0219868 | A1 * | 8/2018 | Nadeau | H04L 63/102 |
| 2019/0012387 | A1 * | 1/2019 | Li | G06Q 50/01 |
| 2019/0089748 | A1 * | 3/2019 | Manor | H04W 28/18 |
| 2019/0132314 | A1 * | 5/2019 | Haravu | H04L 67/1097 |
| 2019/0141536 | A1 * | 5/2019 | Bachmutsky | H04L 67/10 |
| 2019/0268284 | A1 * | 8/2019 | Karame | H04L 9/3236 |
| 2019/0332789 | A1 * | 10/2019 | Vandenbrouck | G06F 21/6218 |
| 2019/0362087 | A1 * | 11/2019 | Ferrans | G06F 21/31 |
| 2020/0007584 | A1 * | 1/2020 | Dixit | H04L 43/08 |
| 2020/0036571 | A1 * | 1/2020 | Witana | H04L 41/0213 |
| 2020/0076819 | A1 * | 3/2020 | Spurlock | H04L 63/10 |
| 2020/0120098 | A1 * | 4/2020 | Berg | H04L 63/101 |
| 2020/0159579 | A1 * | 5/2020 | Shear | G06Q 10/0631 |
| 2021/0144120 | A1 * | 5/2021 | Wang | H04L 63/20 |
| 2021/0273946 | A1 * | 9/2021 | Iqbal | H04L 63/104 |

OTHER PUBLICATIONS

Jaeger, Trent, Frederique Giraud, Nayeem Islam, and Jochen Liedtke. "A role-based access control model for protection domain derivation and management." In Proceedings of the second ACM workshop on Role-based access control, pp. 95-106. 1997. (Year: 1997).*

Karlson, Amy K., AJ Bernheim Brush, and Stuart Schechter. "Can I borrow your phone? Understanding concerns when sharing mobile phones." In Proceedings of the SIGCHI Conference on Human Factors in Computing Systems, pp. 1647-1650. 2009. (Year: 2009).*

Gupta, Aditi, Michael S. Kirkpatrick, and Elisa Bertino. "A formal proximity model for RBAC systems." Computers & Security 41 (2014): 52-67. (Year: 2014).*

Sandhu, Ravi S., Edward J. Coyne, Hal L. Feinstein, and Charles E. Youman. "Role-based access control: A multi-dimensional view." In Tenth annual computer security applications conference, pp. 54-62. IEEE, 1994. (Year: 1994).*

Giordano. "New horizons in the assessment of computer science at school and beyond: Leveraging on the viva platform." In Proceedings of the 2015 ITiCSE on Working Group Reports, pp. 117-147. 2015. (Year: 2015).*

Zuo, Qiong, Meiyi Xie, and Wei-TekTsai. "Autonomous decentralized tenant access control model for sub-tenancy architecture in software-as-a-service (SaaS)." In 2015 IEEE Twelfth International Symposium on Autonomous Decentralized Systems, pp. 211-216. IEEE, 2015. (Year: 2015).*

Zhang, Xinwen, Qi Li, Jean-Pierre Seifert, and Mingwei Xu. "Flexible authorization with decentralized access control model for

(56) References Cited

OTHER PUBLICATIONS grid computing." In 10th IEEE High Assurance Systems Engineering Symposium (HASE'07), pp. 156-165. IEEE, 2007. (Year: 2007).*
Trickey, Hemi, and Alvin Barshefsky. "An access control architecture for managing large-scale network applications." Bell Labs Technical Journal 8, No. 4 (2004): 29-38. (Year: 2004).*
Yialelis, Nicholas, Emil Lupu, and Morris Sloman. "Role-based security for distributed object systems." In Proceedings of WET ICE'96. IEEE 5th Workshop on Enabling Technologies; Infrastucture for Collaborative Enterprises, pp. 80-85. IEEE, 1996. (Year: 1996).*
Zhang, Yun, Farhan Patwa, Ravi Sandhu, and Bo Tang. "Hierarchical secure information and resource sharing in openstack community cloud." In 2015 IEEE International Conference on Information Reuse and Integration, pp. 419-426. IEEE, 2015. (Year: 2015).*

\* cited by examiner

HYBRID ACCESS CONTROL MODEL IN COMPUTER SYSTEMS

FIELD

The present disclosure relates generally to cloud access security, and more specifically, to hybrid access control techniques for a cloud-services computing environment.

BACKGROUND

A modern cloud-services computing environment is increasingly complex, and can include thousands of host computing devices, virtual machines (VMs) and networking components, servicing increasing numbers of clients. Data security of the cloud-services computing environment thus becomes important and sometimes critical. Data security can include, but is not limited to, ensuring that confidential, valuable, and critical enterprise data are not compromised or leaked when cloud-based services are accessed. To provide data security, role-based access control (RBAC) techniques are often used.

In a cloud-services computing environment, RBAC-based access control model is an approach to control cloud access based on roles assigned to security principals. A security principal is a computer-implemented object representing a user, a group of users, a service, or a computer. A user, a group of users, a service, or a computer can request access to systems and resources (e.g., files, directories, virtual machines, applications) in a cloud-services computing environment. A role represents a collection of permissions or access privileges (e.g., a list of permitted operations) with respect to a resource system in the cloud-services computing environment.

Typically, if the resource system is a hierarchical system, access control settings of a parent sub-system (e.g., a parent file directory) propagate to a child sub-system (e.g., a child file directory). As a result, the child sub-system has the same access control settings as the parent sub-system. This is sometimes undesirable. For example, a hierarchical system in a cloud-services computing environment may include files uploaded by both a tenant and a service provider of the cloud-services. The service provider, however, may want to restrict the tenant's access to the files. Due to the propagation nature of the RBAC-based model, however, such a restriction may not be readily performed. Thus, there is a need for techniques to allow flexible adjustment of access control settings obtained by propagation using the RBAC-based model.

OVERVIEW

Described herein are techniques for providing hybrid access control in a cloud-services computing environment. In one embodiment, a method for providing hybrid access control is provided at a host computing device operating in the cloud-services computing environment having one or more processors and memory. The method includes obtaining access control settings associated with a hierarchical computing-resource system. The access control settings include at least a first user's role-based access settings with respect to a first sub-system of the hierarchical computing-resource system. The method further includes propagating the access control settings from the first sub-system to a second sub-system of the hierarchical computing-resource system. The method further includes obtaining user group domains assigned to a plurality of sub-systems of the hierarchical computing-resource system and obtaining a group membership associated with the first user. The plurality of sub-systems includes the first sub-system and the second sub-system. The method further includes determining, based on the obtained user group domains and the obtained group membership associated with the first user, whether the first user's role-based access settings propagated to the second sub-system are to be adjusted. In accordance with a determination that the first user's role-based access settings propagated to the second sub-system are to be adjusted, the method further includes adjusting the first user's role-based access settings propagated to the second sub-system.

In one embodiment, a non-transitory computer-readable storage medium storing one or more programs configured to be executed by a host computing device operating in a cloud-services computing environment having one or more processors and memory is provided. The one or more programs stored by the non-transitory computer-readable storage medium include instructions for obtaining access control settings associated with a hierarchical computing-resource system. The access control settings include at least a first user's role-based access settings with respect to a first sub-system of the hierarchical computing-resource system. The one or more programs further include instructions for propagating the access control settings from the first sub-system to a second sub-system of the hierarchical computing-resource system. The one or more programs further include instructions for obtaining user group domains assigned to a plurality of sub-systems of the hierarchical computing-resource system and obtaining a group membership associated with the first user. The plurality of sub-systems includes the first sub-system and the second sub-system. The one or more programs further include instructions for determining, based on the obtained user group domains and the obtained group membership associated with the first user, whether the first user's role-based access settings propagated to the second sub-system are to be adjusted. In accordance with a determination that the first user's role-based access settings propagated to the second sub-system are to be adjusted, The one or more programs further include instructions for adjusting the first user's role-based access settings propagated to the second sub-system.

In one embodiment, a host computing device operating in the cloud-services computing environment is provided. The host computing device includes one or more processors and memory storing one or more programs configured to be executed by the one or more processors. The one or more programs include instructions for obtaining access control settings associated with a hierarchical computing-resource system. The access control settings include at least a first user's role-based access settings with respect to a first sub-system of the hierarchical computing-resource system. The one or more programs further include instructions for propagating the access control settings from the first sub-system to a second sub-system of the hierarchical computing-resource system. The one or more programs further include instructions for obtaining user group domains assigned to a plurality of sub-systems of the hierarchical computing-resource system and obtaining a group membership associated with the first user. The plurality of sub-systems includes the first sub-system and the second sub-system. The one or more programs further include instructions for determining, based on the obtained user group domains and the obtained group membership associated with the first user, whether the first user's role-based access settings propagated to the second sub-system are to be adjusted. In accordance with a determination that the first user's role-based access settings propagated to the second sub-system are to be adjusted, The one or more programs further include instructions for adjusting the first user's role-based access settings propagated to the second sub-system.

DETAILED DESCRIPTION

In the following description of embodiments, reference is made to the accompanying drawings in which are shown by way of illustration specific embodiments that can be practiced. It is to be understood that other embodiments can be used and structural changes can be made without departing from the scope of the various embodiments.

As described above, existing techniques for performing access control in a cloud-services computing environment are largely RBAC-based. These existing techniques do not, or are unable to, take into account a user's group membership due to the control-settings propagation nature of the RBAC approach. Possible approaches for solving this problem include, for example, defining the access control settings on a more detailed level before the control settings are propagated to sub-systems in a hierarchical computing-resource system, or designing a completely new access control model different from the existing RBAC-based model. For example, a possible approach may require defining multiple root sub-systems and defining multiple access control settings for the corresponding root sub-systems. The access control settings defined for each root sub-system can thus propagate to their corresponding child sub-systems. But these approaches are generally time-consuming, complicated, error prone, and inefficient. They also may not solve the issue that there is still a system administrator that can have access privileges to all sub-systems in a hierarchical computing-resource system, despite that the system administrator should not be given access privileges to some sub-systems that are associated with another user group.

The hybrid access control techniques described in this application do not require a complete re-design or significant alteration of the RBAC-based model. Instead, the hybrid access control techniques perform adjustments of access control settings (e.g., revoke or limit the access privileges of a user) after the role-based access control settings are propagated through the hierarchical computing-resource system. As a result, there is no need to define multiple root sub-systems and define access control settings for each sub-system at a more detailed level. Access control settings with respect to each sub-system can be readily and correctly adjusted based on each user's group membership. The hybrid access control techniques thus improve the efficiency of performing access control in a cloud-services computing environment. And because there is no need to re-design a new access control model different from the popular RBAC-based model, the hybrid access control techniques can be easily and cleanly integrated with any existing RBAC-based models.

Figure 1B:
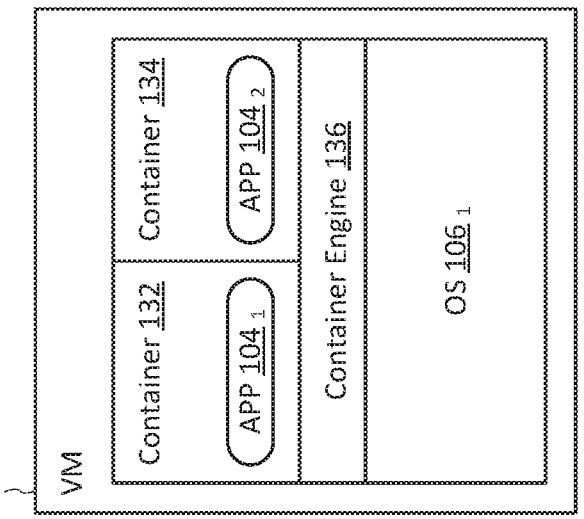
FIG. 1B is a block diagram illustrating a containerized application framework for implementing various components of a distributed-computing system, in accordance with some embodiments.
Figure 1A:
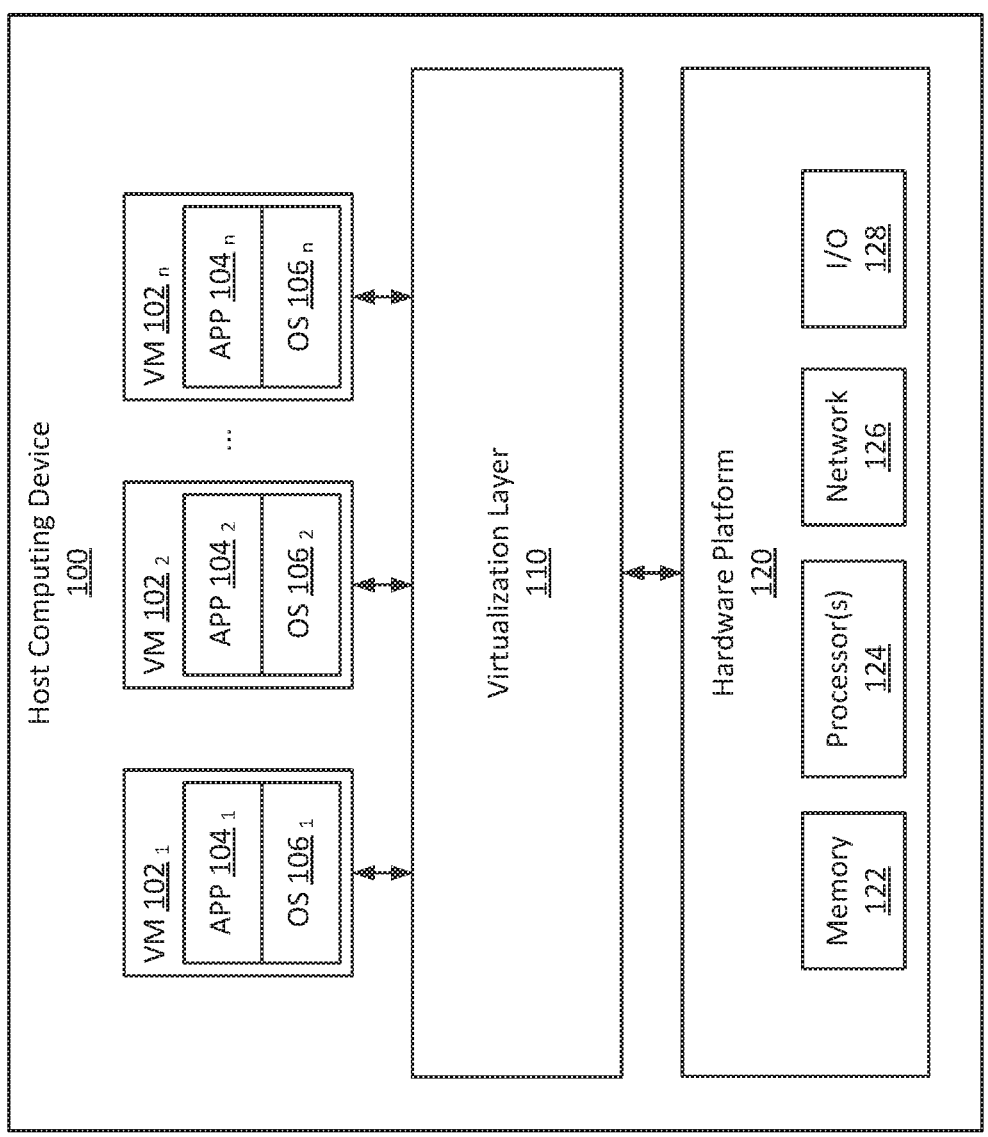
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) $102_1$, $102_2 \ldots 120_n$ are instantiated on host computing device 100. In some embodiments, host computing device 100 implements one or more elements of a distributed-computing system (e.g., a distributed-computing system operating in a client computing environment and/or a cloud-services computing environment described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (e.g., programs containing software code) and the hardware resources used to execute or run applications. However, in this case, the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (e.g., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
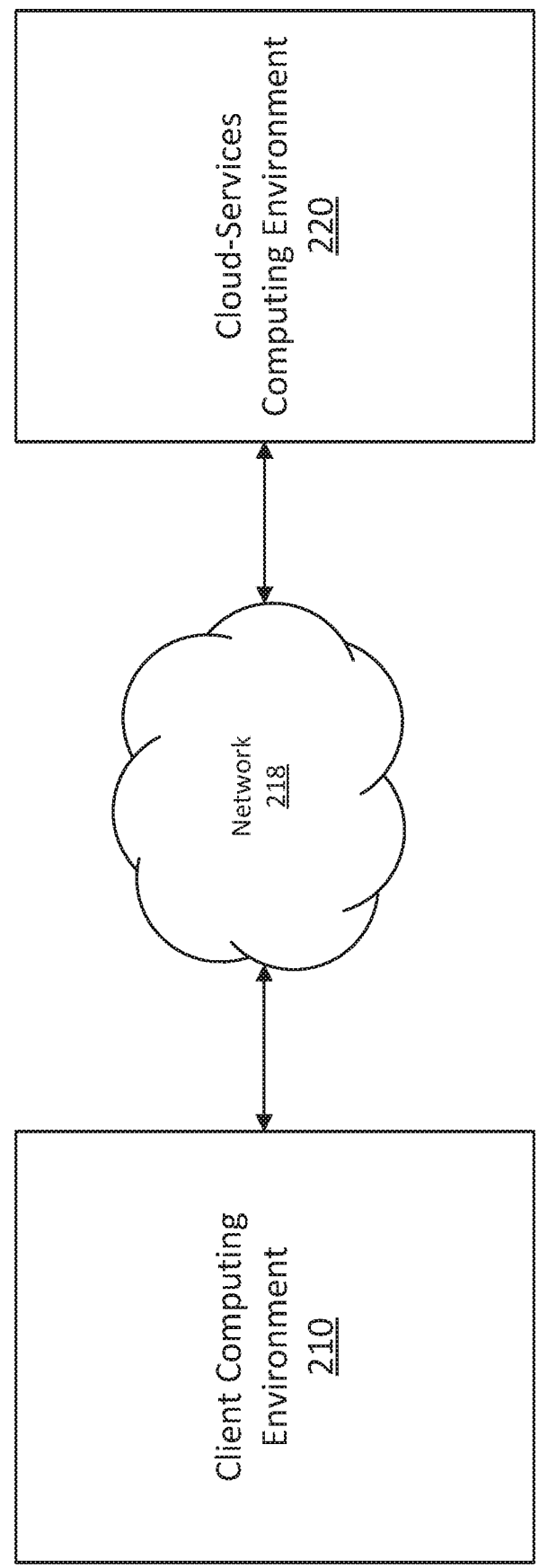
FIG. 2 is a block diagram illustrating systems and environments for communicating between a client computing environment and a cloud-services computing environment, in accordance with some embodiments.

FIG. 2 illustrates systems and environments for communicating between a client computing environment 210 and a cloud-services computing environment 220, in accordance with some embodiments. Client computing environment 210 can include one or more client computing device(s). The client computing device(s) can be implemented by, for example, host computing device 100 as described above, and thus can operate one or more virtual machines. In some embodiments, based on a user input received at a user interface (e.g., a login interface), client computing device 212 can obtain a user identity for accessing cloud-services computing environment 220. The user identity can include user credentials such as a user name, a password, a passcode, a pin number, finger prints, biometric identifications, or the like. In some embodiments, client computing device 212 can also obtain a user request for accessing a computing-resource system in cloud-services computing environment 220. For example, a user request can be an application program interface (API) call that uses HTTP requests to retrieve a data record (e.g., a GET request), to store a data record (e.g., a PUT request), to generate a new data record (e.g., a POST request), or to remove a data record (e.g., a DELETE request). An application can be a software or program (e.g., software code or a group of instructions) that, when executed, performs certain functions, tasks, and/or activities. A process can be an instance of an application or a portion of an instance of an application. An application or a portion thereof can be instantiated to form a process. For example, an application can be instantiated to form one or more processes that, when executed, performs various data manipulation tasks based on the user request (e.g., GET, PUT, POST, DELETE).

In some embodiments, client computing environment 210 can be a private network operating within an on-premise client's network infrastructure. An on-premise client's network infrastructure can include networks operating at one or more physical locations of a client (e.g., a company or a business organization) and typically operates behind a firewall. As a result, unauthorized communication with systems operating in client computing environment 210 can be blocked or filtered.

In some embodiments, systems operating in client computing environment 210 can initiate communication with other computing environments (e.g., cloud-services computing environment 220) outside of the on-premise client's network infrastructure. For example, systems operating in client computing environment 210 can establish a persistent connection (e.g., HTTP, HTTP/2, TCP, and/or UDP connection) with cloud-services computing environment 220 (e.g., a private/public network operating at the cloud service provider's locations) via network 218 (e.g., a public network such as Internet) to deliver data (e.g., user credentials, user requests, etc.) for processing, analyzing, and/or storing by systems operating in cloud-services computing environment 220. Client computing environment 210 and cloud-services computing environment 220 can include two separate networks that do not overlap, and can be separated by a public network (e.g., network 218). While the two computing environments 210 and 220 can be operating in separate networks, data can be delivered across network boundaries from one computing environment to another. As illustrated in FIG. 2, client computing device(s) operate in client computing environment 210, which is a separate network from cloud-services computing environment 220. Thus, client computing devices are external to cloud-services computing environment 220.

In some embodiments, for data security, access control to cloud-services computing environment 220 is performed by one or more systems operating in cloud-services computing environment 220. The one or more systems can include, for example, a host computing device or a virtual machine. As described in more detail below, such access control can dynamically adjust a user's role-based access settings to take into account of user's group membership.

Figure 3A:
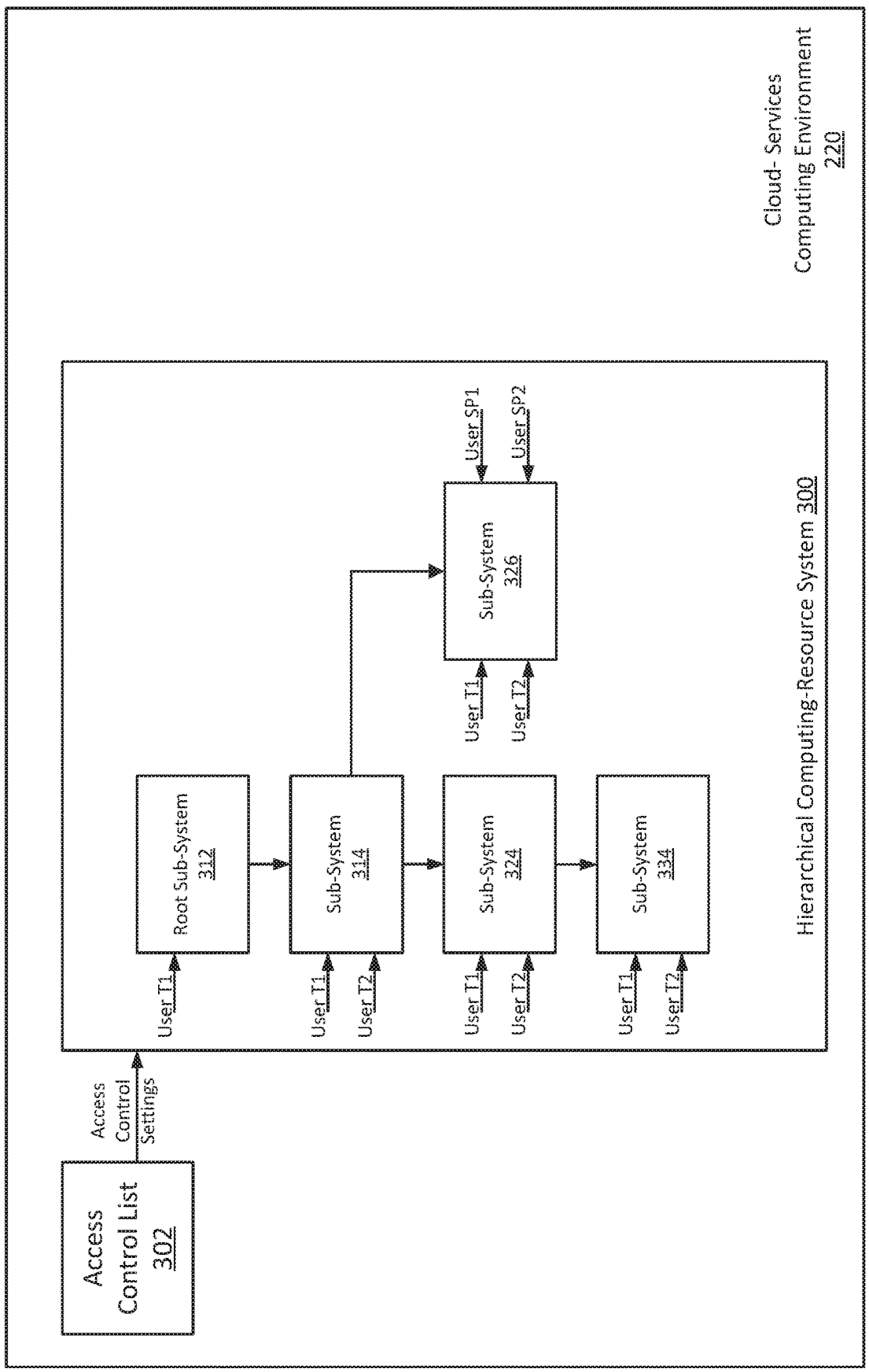
FIG. 3A is a block diagram illustrating propagation of access control settings associated with a hierarchical computing-resource system in a cloud-services computing environment in accordance with some embodiments.

FIG. 3A is a block diagram illustrating propagation of access control settings associated with a hierarchical computing-resource system 300 in a cloud-services computing environment 220 in accordance with some embodiments. With reference to FIG. 3A, system 300 can have a hierarchical resource structure including one or more hierarchies.

One or more sub-systems of system 300 can be organized into one or more hierarchies. In system 300, sub-systems include, for example, a root sub-system 312 and one or more sub-systems 314, 324, 326, and 334. As shown in FIG. 3, from top to bottom, root sub-system 312 is associated with a first hierarchy; sub-system 314 is associated with a second hierarchy; sub-systems 324 and 326 are associated with a third hierarchy; and sub-system 334 is associated with a fourth hierarchy. The first hierarchy is a parent hierarchy of the second hierarchy; the second hierarchy is a parent hierarchy of the third hierarchy; and so forth. A hierarchical computing-resource structure thus represents organizational relations between sub-systems associated with the hierarchies. For example, system 300 can be a hierarchical file system. Therefore, root sub-system 312 can be a root directory for storing files and sub-directories. Sub-system 314 can be a child directory of root sub-system 312; sub-systems 324 and 326 can be child directories of sub-system 314; and so forth.

In hierarchical computing-resource system 300, sub-systems can be any computer implemented objects such as files, folders, applications, virtual machines, data centers, data stores, or the like. For example, in some embodiments, root sub-system 312 can be a data center management server application; sub-system 314 can be one or more data center application(s); sub-system 324 can be storage folders associated with a first user group domain (e.g., a domain corresponding to users of a tenant or customer of a cloud service); sub-system 326 can be storage folders or an application associated with a second group of users (e.g., a domain corresponding to users of a cloud-service provider); and sub-system 334 can be a data store.

With reference to FIG. 3A, a host computing device (e.g., host computing device 100 shown in FIG. 1A) or a virtual machine (e.g., VM 102) can obtain an access control list 302 associated with hierarchical computing-resource system 300. In some embodiments, access control list 302 includes access control settings with respect to one or more sub-systems of hierarchical computing-resource system 300. The access control settings can include, for example, a user's role-based access settings with respect to one or more sub-systems of hierarchical computing-resource system 300. For example, if a user's role is a system administrator, the user's role-based access settings may indicate that the user has access privileges with respect to all sub-systems. In some embodiments, each security principal (a computer-implemented object representing a user, a group of users, a service, or a computer) can be assigned (e.g., by a system administrator based on organization policies) with one or more role-based access settings with respect to one or more sub-systems. For simplicity, access control settings are describe below with reference to a user, rather than a security principal. It should be appreciated that the descriptions below can also be applied to a group of users, a service, or a computer that is represented by a security principal.

In some embodiments, access control settings can be predetermined based on the roles of the users. As shown in FIG. 3A, for example, the role of user T1 may be a system administrator. Thus, access control settings for user T1 can be predetermined such that user T1 has full access privileges (e.g., permission to read, write, move, delete, etc.) with respect to root sub-system 312. In contrast, the role of user T2 may be a restricted user. Thus, access control settings for user T2 can be predetermined such that user T2 does not have access privileges with respect to root sub-system 312 (e.g., no permission at all) or has limited access privileges (e.g., no permission to write, move, or delete; but has permission to read) with respect to root sub-system 312. Further, access control settings can also be predetermined for user T2 such that user T2 has full access privileges with respect to sub-systems 314, 324, and 334.

In some embodiments, access control settings need not be predetermined for all sub-systems in a hierarchical computing-resource system. Access control settings can propagate from a sub-system associated with a parent hierarchy to a sub-system associated with a child hierarchy. As an example shown in FIG. 3A, access control settings for user T1 can be propagated from root sub-system 312 of the first hierarchy to sub-system 314 of the second hierarchy, and then to sub-systems 324 and 326 of the third hierarchy, and so forth. For propagating the access control settings from a first sub-system to a second sub-system, a host computing device or a virtual machine of hierarchical computing-resource system 300 can determine a relation between the first sub-system and the second sub-system. Based on the determined relation, system 300 can assign a user's role-based access settings with respect to the second sub-system. For example, the host computing device or virtual machine can determine the parent-child relation between the hierarchies associated with sub-systems 312 and 314. Based on this determined relation, access control settings for user T1 can be assigned with respect to sub-system 314 based on the settings for user T1 with respect to sub-system 312. Similarly, the host computing device or virtual machine can determine the parent-child relation between the hierarchies associated with sub-systems 314 and 324. Based on the determined relation, access control settings for both users T1 and T2 can be assigned with respect to sub-system 324 based on the corresponding settings for users T1 and T2 with respect to sub-system 314. In the example shown in FIG. 3A, access control settings for users T1 and T2 with respect to sub-systems 324 and 326 are thus the same as those with respect to sub-system 314. That is, users T1 and T2 both have access privileges with respect to sub-systems 324 and 326. As discussed above, the access control settings include role-based access settings. And therefore, the role-based access settings for users T1 and T2 can be propagated one sub-system to another.

As described above, in the example shown in FIG. 3A, user T1 is a system administrator. User T1 is thus assigned with full access privileges to all sub-systems 312, 314, 324, 326, and 334. User T2 is a restricted user. User T2 is thus assigned with, for example, access privileges to sub-systems 314, 324, 326, and 334, but not to root sub-system 312. FIG. 3A further illustrates different group memberships associated with the users. For example, user T1 and T2 can be members of a customer or tenant of cloud-services computing environment 220. User SP1 and SP2, as shown in FIG. 3A, can be members of a service provider group of cloud-services computing environment 220. User SP1 and SP2 can be assigned with access privileges to, for example, only sub-system 326 (e.g., a virtual root sub-system for the service provider) but not other sub-systems (e.g., file folders for the tenant). As illustrated in FIG. 3A, sub-system 326 is associated with a hierarchy that is a child hierarchy associated with sub-system 314. As a result, access control settings (e.g., role-based access settings) for users T1 and T2 may be propagated from sub-systems 314 to sub-system 326. And therefore, users T1 and T2, although members of the tenant group, may have access privileges to sub-system 326. This may not be desirable because sub-system 326 is a system for the service provider. And the service provider may want to prevent or limit the access privileges of the tenant group members with respect to sub-system 326. Accordingly, the propagated access control settings with respect to sub-system 326 should be adjusted. The adjustment can be performed using hybrid access control techniques described below.

Figure 3B:
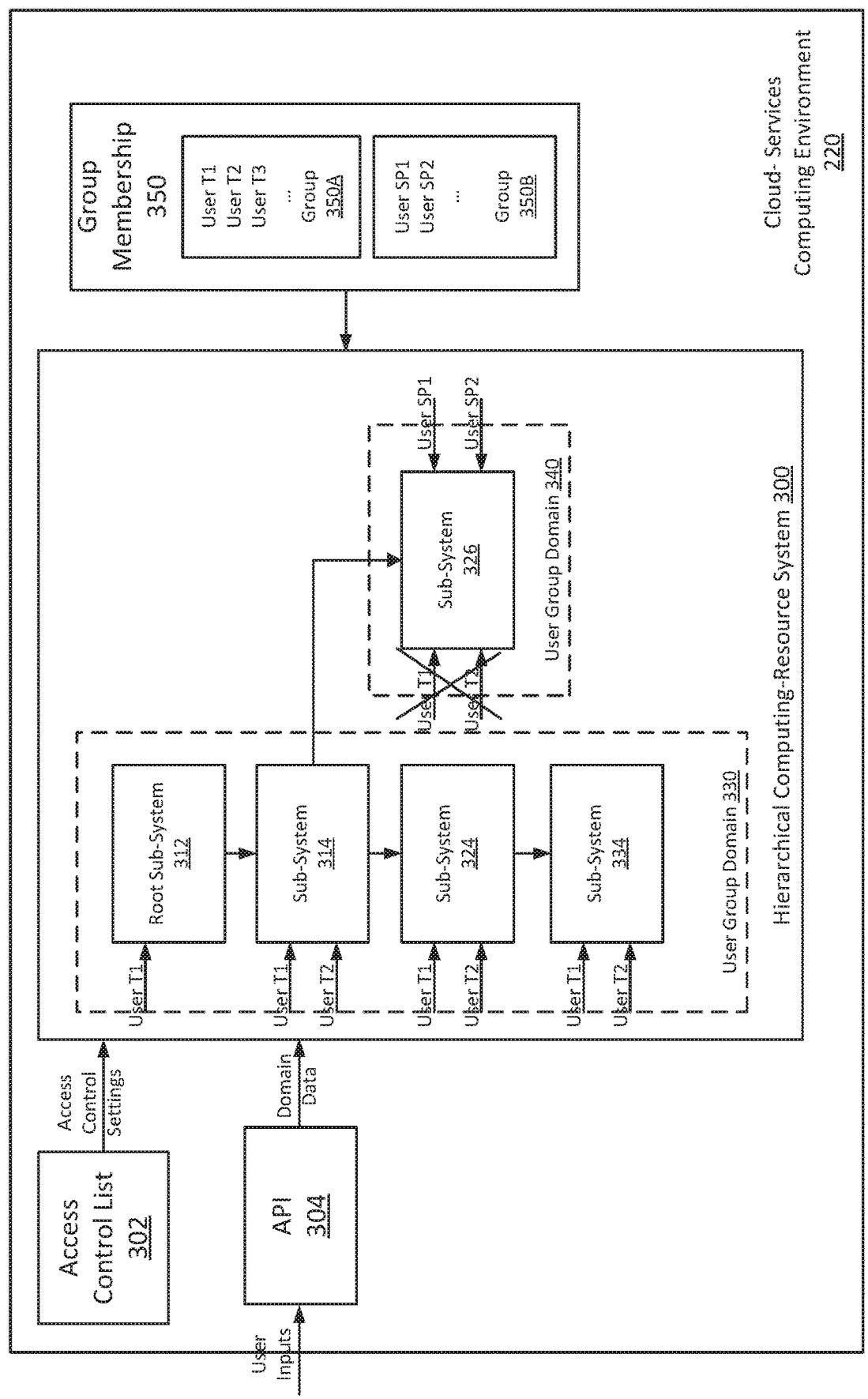
FIG. 3B is a block diagram illustrating adjusting access control settings with respect to a sub-system of a hierarchical computing-resource system using hybrid access control techniques, in accordance with some embodiments.

FIG. 3B is a block diagram illustrating adjusting propagated access control settings associated with hierarchical computing-resource system 300 using hybrid access control techniques, in accordance with some embodiments. With reference to FIG. 3B, similar to those shown in FIG. 3A, access control settings have been assigned for all users (e.g., users T1, T2, SP1, and SP2) to one or more sub-systems (e.g., root sub-system 312, sub-system 326). These access control settings are then propagated to all sub-systems (e.g., from sub-system 312 to sub-system 314) in hierarchical computing-resource system 300. In some embodiments, a host computing device or a virtual machine operating in system 300 can obtain user group domains assigned to the sub-systems of system 300. User group domains represent a domain or a grouping of sub-systems based on the user groups. For example, as shown in FIG. 3B, sub-systems 312, 314, 324, and 334 can be grouped together because they are all sub-systems associated with a tenant of system 300. Thus, these sub-systems can be assigned with a user group domain 330. Sub-system 326, on the other hand, is a sub-system associated with a service provider of system 300. Thus, sub-system 326 can be assigned with a different user group domain 340.

In some embodiments, to assign the sub-systems to their corresponding user group domains, a host computing device or a virtual machine operating in system 300 can receive domain data and annotate the sub-systems based on the domain data. As shown in FIG. 3B, user inputs associate with assigning user group domains can be received via application program interface (API) 304. In some embodiments, the user inputs can also be used to generate domain data for assigning the user group domains to one or more of the sub-systems. In the example shown in FIG. 3B, the domain data can represent a user group domain 330 and a user group domain 340. User group domain 330 can be a domain of sub-systems 312, 314, 324, and 334 that are associated with a tenant of cloud-services computing environment 220. Sub-systems 312, 314, 324, and 334 can be, for example, a tenant's inventory objects. User group domain 340 can be a domain of sub-systems (e.g., sub-system 326) that are associated with a service provider of cloud-services computing environment 220. Sub-system 326 can be, for example, the service provider's inventory object. Based on the domain data, the host computing device or a virtual machine operating in system 300 can annotate the plurality of sub-systems of the hierarchical computing-resource system 300. The annotation effectively divides system 300 into different domains of sub-systems. For example, sub-systems 312, 314, 324, and 334 are annotated with user group domain 330; and sub-system 326 is annotated with user group domain 340. Dividing a hierarchical computing-resource system 300 into different domains of sub-systems is sometimes also referred to as containerization.

In some embodiments, based on the domain data generated from the user inputs, a host computing device or a virtual machine operating in system 300 can determine and annotate a sub-system as a virtual root sub-system. The virtual root sub-system can be used for performing group membership determination for the purpose of adjusting access control settings. For example, sub-system 326 may be determined as the virtual root sub-system for performing group membership determination. Any sub-systems associated with a hierarchy that is above the hierarchy associated with sub-system 326 do not require group membership determination (e.g., because they all belong to same user group domain). And any sub-systems of a hierarchy that is at or below the hierarchy associated with sub-system 326 require group membership determination (e.g., because they may belong to a mix of different user group domains). In FIG. 3B, for example, based on the determination that sub-system 326 as the virtual root sub-system, sub-systems 312 and 314 can be determined to require a group member determination. And sub-systems 324, 326, and 334 can be determined to not require a group membership determination. Thus, based on the domain data, a host computing device or a virtual machine can effectively provide a virtual propagation boundary along the virtual root system (e.g., the virtual boundary between sub-system 314 and sub-system 326). In some embodiments, access control settings may not propagate beyond the propagation boundary. For example, the access control settings of user T1 and T2 with respect to sub-system 314 may not propagate to sub-system 326 because there is a virtual propagation boundary between the two sub-systems.

In some embodiments, access control settings (e.g., role-based access settings) may have already been propagated to all the sub-systems in hierarchical computing-resource system 300. As discussed above, the propagated access control settings with respect to one or more sub-systems may need to be adjusted to account for the user's group membership. Adjustment of access control settings can be performed by a permission evaluation engine (not shown) operating on a host computing device or a virtual machine of system 300. The permission evaluation engine can be hardware, software, or a mix thereof. In some embodiments, the permission evaluation engine obtains a group membership 350. Group membership 350 can include a data structure (e.g., a look-up table) that represents a relation between a user and a group. For example, as illustrated in FIG. 3B, group membership 350 can represent a relation indicating that users T1-T3 belong to a user group 350A (e.g., a tenant user group); and users SP1 and SP2 belong to a user group 350B (e.g., a service provider user group). In the example shown in FIG. 350B, user groups 350A and 350B are different and separate from each other, such that users in one group do not belong to the other group. In some examples, different user groups may have one or more common users. For example, a user in one group may also belong to another group. Group membership 350 can be stored, for example, in a database associated with system 300 and updated when there is any change.

In some embodiments, based on the user group domains and the group membership, the permission evaluation engine can determine whether a user's access control settings propagated to one or more sub-systems are to be adjusted. With reference to FIG. 3B, as described above, access control settings of users T1 and T2 (e.g., role-based access settings) can be propagated from sub-system 314 to sub-system 326. As a result, users T1 and T2 have access privileges (e.g., read, write) to sub-system 326. However, sub-system 326 may be, for example, a file folder storing files (e.g., cloud-service application/installation files, service logs, etc.) for the service provider of cloud-services computing environment 220. Thus, it may not be desirable to permit users T1 and T2 to access sub-system 326 because users T1 and T2 are users of a tenant group. In some embodiments, based on the user group domain assigned to sub-system 326, the permission evaluation engine can determines, for example, that the user group domain of sub-system 326 is user group domain 340, which is a domain associated with a service provider user group.

The permission evaluation engine can further determine users' group membership based on obtained group membership 350. For example, the permission evaluation engine determines that users T1 and T2 all belong to user group 350A, which is a tenant user group. Next, the permission evaluation engine determines whether users T1 and T2 are members of a user group corresponding to the user group domain 340. In this example, they are not. Accordingly, the permission evaluation engine determines that users T1 and T2's propagated access control settings (e.g., their role-based access settings) with respect to sub-system 326 are to be adjusted.

After the adjustment determination is made, the permission evaluation engine can proceed to adjust the access control settings. For example, as illustrated in FIG. 3B, users T1 and T2's access privileges (e.g., read, write, edit, delete, etc.) with respect to sub-system 326 can be revoked such that they no longer have access privileges to sub-system 326. In some embodiments, users T1 and T2's access privileges may be limited such that they can retain some—but not all—access privileges to sub-system 326.

The adjustment of the access control settings described in this application is based not only on a user's role but also on a user's membership group. For example, user T1 may be a system administrator. Before the adjustment of the propagated access control settings, user T1 has full access privileges to all sub-systems in hierarchical computing-resource system 300, including the sub-system 326 associated with a service provider user domain (e.g., domain 340). Because the adjustment of access control settings is further based on the group membership, user T1's access privileges with respect to sub-system 326 can thus be revoked or limited despite that user T1 is a system administrator.

Figure 3C:
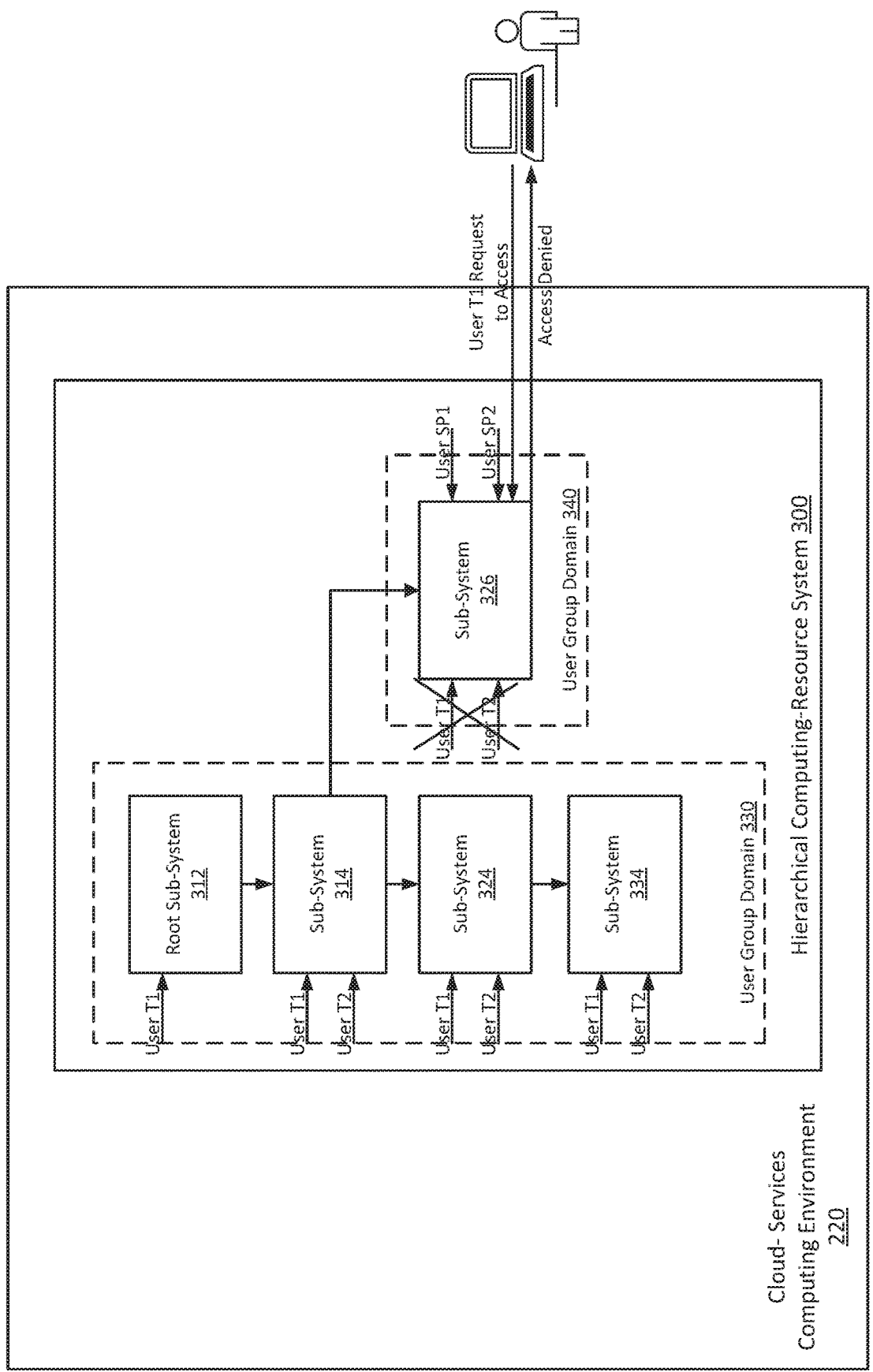
FIG. 3C is a block diagram illustrating performing access control of computing resources in a hierarchical computing-resource system based on adjusted access control settings, in accordance with some embodiments.

As illustrated in FIG. 3C, a host computing device or a virtual machine operating in system 300 may receive, from user T1, a request to access sub-system 326. Based on the adjusted access control settings, the host computing device or the virtual machine can determine that user T1's role-based access privileges with respect to sub-system 326 have been revoked. Accordingly, the host computing device or the virtual machine denies the access request from user T1, despite that user T1 is a system administrator of the hierarchical computing-resource system 300. Therefore, unlike a pure RBAC system, a system administrator may not have access privileges to all sub-systems in a hierarchical computing-resource system 300 implemented using the hybrid access control techniques.

As described above, the hybrid access control techniques described in this application can adjust access control settings based not only on a user's role but also on a user's membership group. For example, a user belonging to a tenant user group may not have access to any sub-systems that are in the service provider user group domain, regardless of the user's role (e.g., administrator or restricted user). The hybrid access control techniques thus improve the security of the cloud-services computing environment by containerizing of sub-systems assigned with different user group domains.

As described above, some existing approaches for improving the RBAC-based model can require designing a completely new access control model different from the existing RBAC-based model. For example, a possible approach may require defining multiple root sub-systems and defining multiple corresponding access control settings for the multiple root sub-systems. The access control settings defined for each root sub-systems can then propagate to their corresponding sub-systems associated with the child hierarchies. These approaches are usually complicated, time-consuming, error prone, and inefficient. For example, under certain circumstances, a same sub-system may be shared between multiple user group domains; and/or it may be part of a multiple hierarchies in the hierarchical computing-resource system. Existing approach of having multiple root sub-systems may not properly or correctly perform access controls under these circumstances.

Unlike the existing techniques, the hybrid access control techniques described in this application does not require a complete re-design or significant alteration of the RBAC-based model. Instead, the hybrid access control techniques perform adjustments of access control settings (e.g., revoke or limit the access privileges of a user) after the role-based access settings are propagated through the hierarchical computing-resource system. As a result, there is no need to define multiple root sub-systems and define access control settings for each sub-system at a more detailed level. Access control settings with respect to each sub-system can be readily and correctly adjusted based on each user's group membership. The hybrid access control techniques thus improves the efficiency of access control in a cloud-services computing environment. And because there is no need to re-design a new access control model different from the popular RBAC-based model, the hybrid access control techniques can be easily and cleanly integrated with any existing RBAC-based models.

Figure 3D:
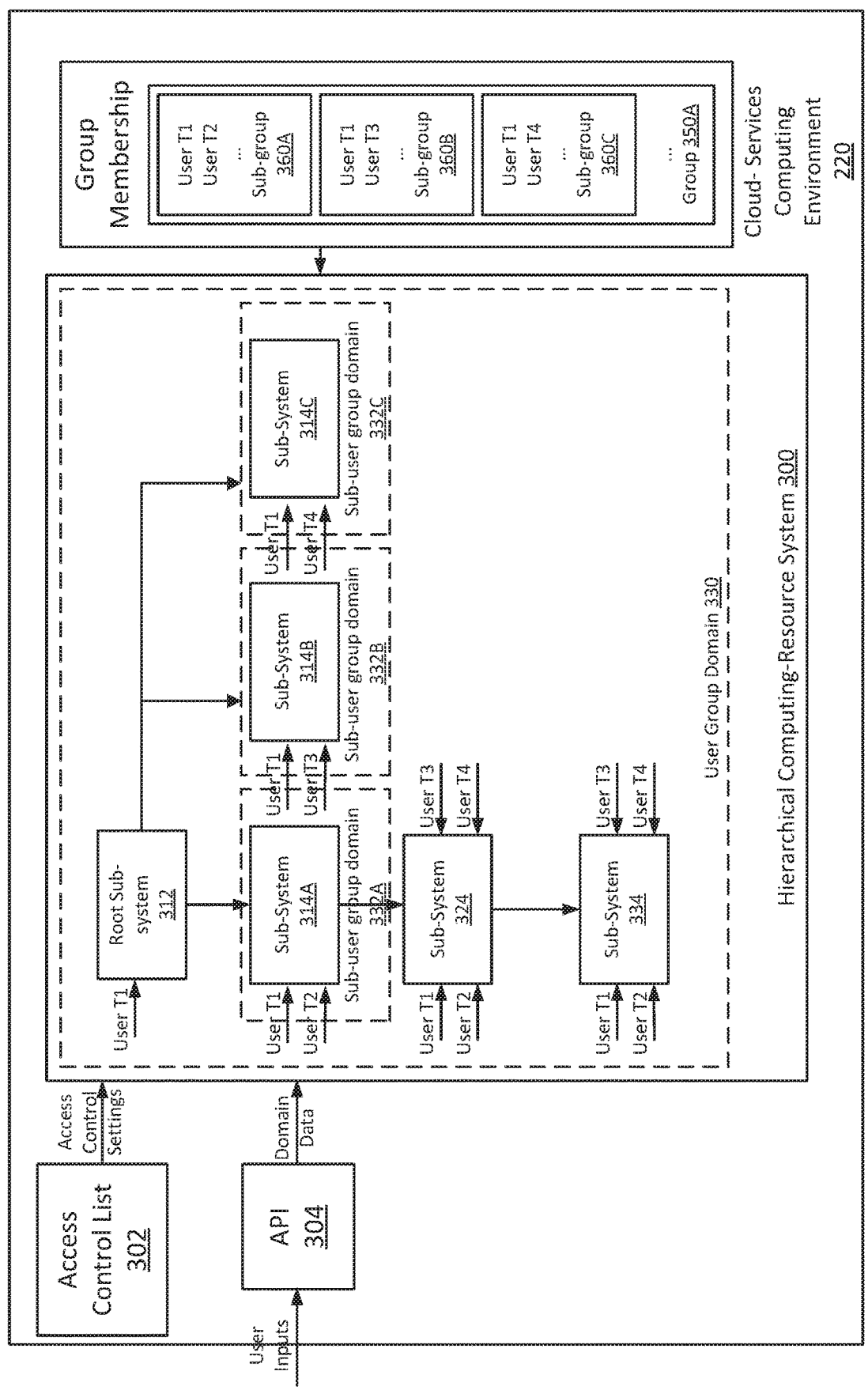
FIG. 3D is a block diagram illustrating adjusting access control settings with respect to sub-systems having different sub-user group domains, in accordance with some embodiments.

As described above, each of the sub-systems in a hierarchical computing-resource system 300 can be assigned with a user group domain. In some embodiments, a user group domain can include a plurality of sub-user group domains. FIG. 3D illustrates a plurality of sub-user group domains 332A-C included in user group domain 330. As described above, in one example, user group domain 330 can be assigned to sub-systems associated with tenant user group 350A. For example, based on the domain data received, a host computing device or a virtual machine can annotate sub-systems 312, 314A-C, 324, and 334 with user group domain 330. Similarly, sub-user group domains 332A-C can be assigned to sub-systems associated with sub-groups 360A-C. The sub-groups 360A-C can represent, for example, users of different departments in tenant user group 350A. As shown in FIG. 3D, based on received domain data, a host computing device or a virtual machine can annotate sub-systems 314A-C with sub-user group domain 332A-C, respectively. As a result, sub-systems 314A-C are effectively or virtually containerized based on their different sub-user group domains 332A-C, respectively. In FIG. 3D, sub-systems 314A-C are associated with a same hierarchy. It should be appreciated that the effective or virtual containerization (e.g., by assigning sub-domains to sub-systems) can be performed in a similar manner with respect to any sub-systems included in different hierarchies of a hierarchical computing-resource system.

With reference to FIG. 3D, in some embodiments, after the sub-systems 314A-C are assigned with their corresponding sub-user group domains 332A-C, respectively, access control settings with respect to sub-systems 314A-C can be adjusted in a similar manner as described above. For example, as shown in FIG. 3D, users T1-T4 are all users of a tenant user group 350A. User T1 is a system administrator. Users T2-T4 are restricted users. These users' role-based access settings can be propagated through hierarchical computing-resource system 300. Based on the propagation, a host computing device or a virtual machine can determine, for example, that users T1 has access privileges to all sub-systems because user T1 is a system administrator. It can further determine that users T2-T4 have access privileges to sub-systems 314A-C, 324, and 334, but not root sub-system 312.

As described above, a host computing device or a virtual machine can assign sub-systems 314A-C with their corresponding sub-user group domains 332A-C. Based on such assignment and based on the group membership of the users T1-T4, the host computing device or the virtual machine can determine whether a particular user's role-based access settings are to be adjusted. For example, the group membership indicates that user group 350A includes sub-groups 360A-C (e.g., user groups of different departments within an organization). Sub-group 360A (e.g., a user group of a sales department) includes users T1 and T2; sub-group 360B (e.g., a user group of an engineering department) includes users T1 and T3; and sub-group 360C (e.g., a user group of a finance department) includes users T1 and T4. Thus, the role-based access settings of users T3 and T4 are adjusted (e.g., revoked or limited) with respect to sub-system 314A, because these users are not part of the sub-group 360A. Similarly, the role-based access settings of users T2 and T4 are adjusted (e.g., revoked or limited) with respect to sub-system 314B; and the role-based access settings of users T2 and T3 are adjusted (e.g., revoked or limited) with respect to sub-system 314C. As a result, if users T3 or T4 request access to sub-system 314A, the request may be denied because their access privileges have been revoked. The hybrid access control techniques thus improve the security of the cloud-services computing environment by further containerizing of sub-systems assigned with different sub-user group domains. While FIG. 3D illustrates user group domain 330 includes three sub-user group domains 332A-C, it is appreciated that a user group domain can include any number of sub-user group domains organized in any number of hierarchies.

Figure 4A:
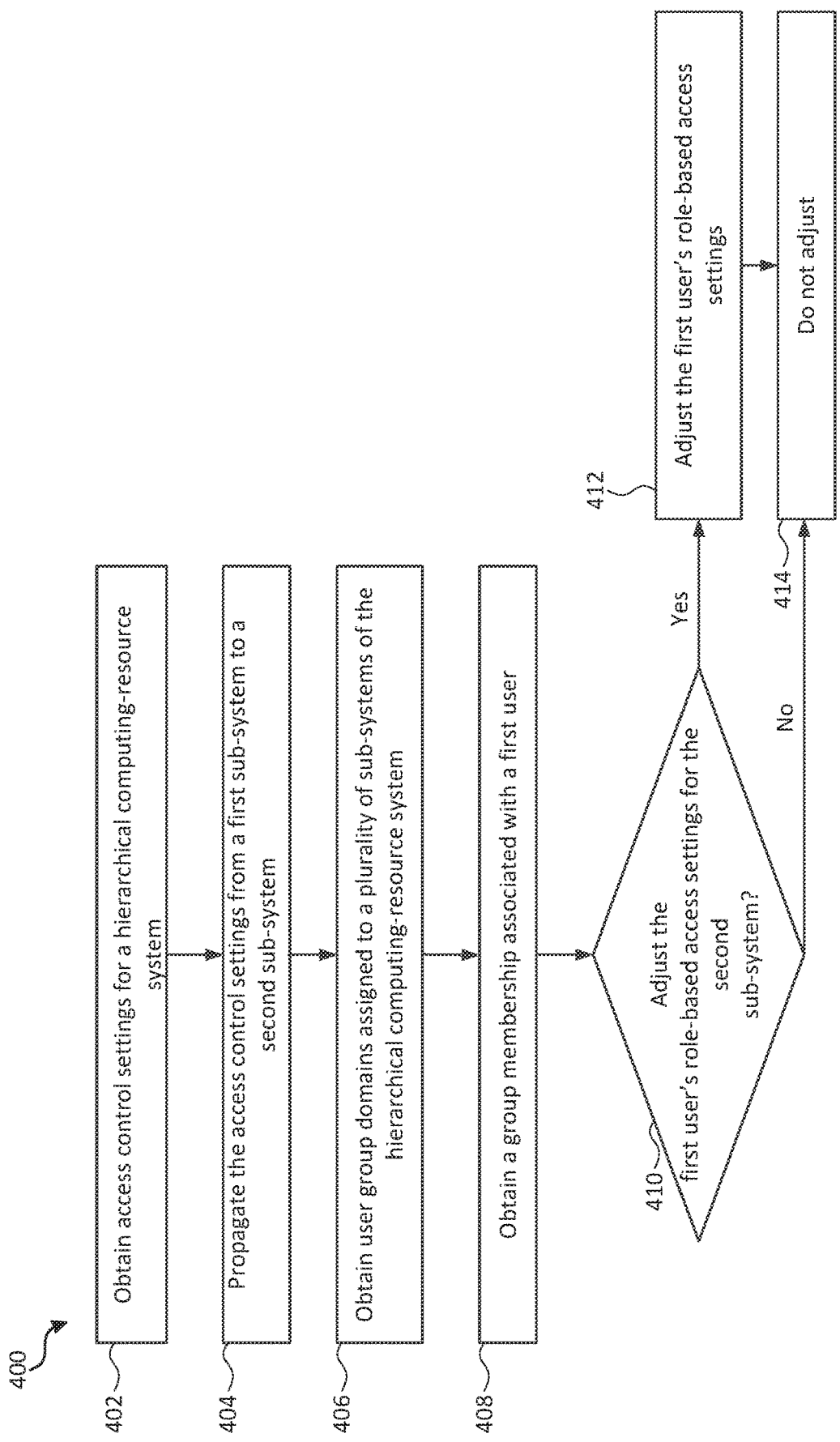
FIGS. 4A-4B illustrates flowcharts of exemplary processes for providing hybrid access control in a cloud-services computing environment, in accordance with some embodiments.

FIG. 4A illustrates a flowchart of an exemplary process 400 for providing hybrid access control in a cloud-services computing environment, in accordance with some embodiments. Process 400 is performed, for example, using a host computing device or a virtual machine operating in the cloud-services computing environment having one or more processors and memory (e.g., host computing device 100/300 and cloud-services computing environment 220 described above). In some embodiments, the operations of processes 400 are distributed across the various components or sub-systems (e.g., an API interface, a performance evaluation engine) operating on the host computing device. In processes 400, some blocks are, optionally, combined, the order of some blocks is, optionally, changed, and some blocks are, optionally, omitted. In some embodiments, additional operations may be performed in combination with processes 400.

At block 402, access control settings associated with a hierarchical computing-resource system are obtained. The access control settings include at least a first user's role-based access settings with respect to a first sub-system of the hierarchical computing-resource system. For example, as shown in FIG. 3A, an access control list (ACL) 302 can be obtained. Access control settings included in the ACL 302 can thus be provided to hierarchical computing-resource system 300. The access control settings can include, for example, user T1's role-based access settings with respect to root sub-system 312.

At block 404, the access control settings are propagated from the first sub-system to a second sub-system of the hierarchical computing-resource system. In some embodiments, for propagating the access control settings, a relation between the first sub-system and the second sub-system is determined. Based on the determined relation between the first sub-system and the second sub-system, the first user's role-based access settings with respect to the second sub-system is assigned. For example, as shown in FIG. 3A, the relation of root sub-system 312 and sub-system 314 can be determined (e.g., they are sub-systems of parent-child hierarchies). Based on the relation, the role-based access settings of user T1 can be propagated from root sub-system 312 to sub-system 314, and similarly to sub-system 324, and so forth.

At block 406, user group domains assigned to a plurality of sub-systems of the hierarchical computing-resource system are obtained. For example, as illustrated in FIG. 3B, user group domains 330 and 340 can be obtained from the domain data. User group domain 330 is assigned to root sub-system 312 and sub-systems 314, 324, and 334. User group domain 340 is assigned to sub-system 326.

At block 408, a group membership associated with the first user is obtained. For example, as shown in FIG. 3B, the group membership of user T1 is obtained from group membership 350. Similarly, the group membership of user T2 is obtained.

At block 410, based on the obtained user group domains and the obtained group membership associated with the first user, it is determined whether the first user's role-based access settings propagated to the second sub-system are to be adjusted. This determination is further illustrated in FIG. 4B.

Figure 4B:
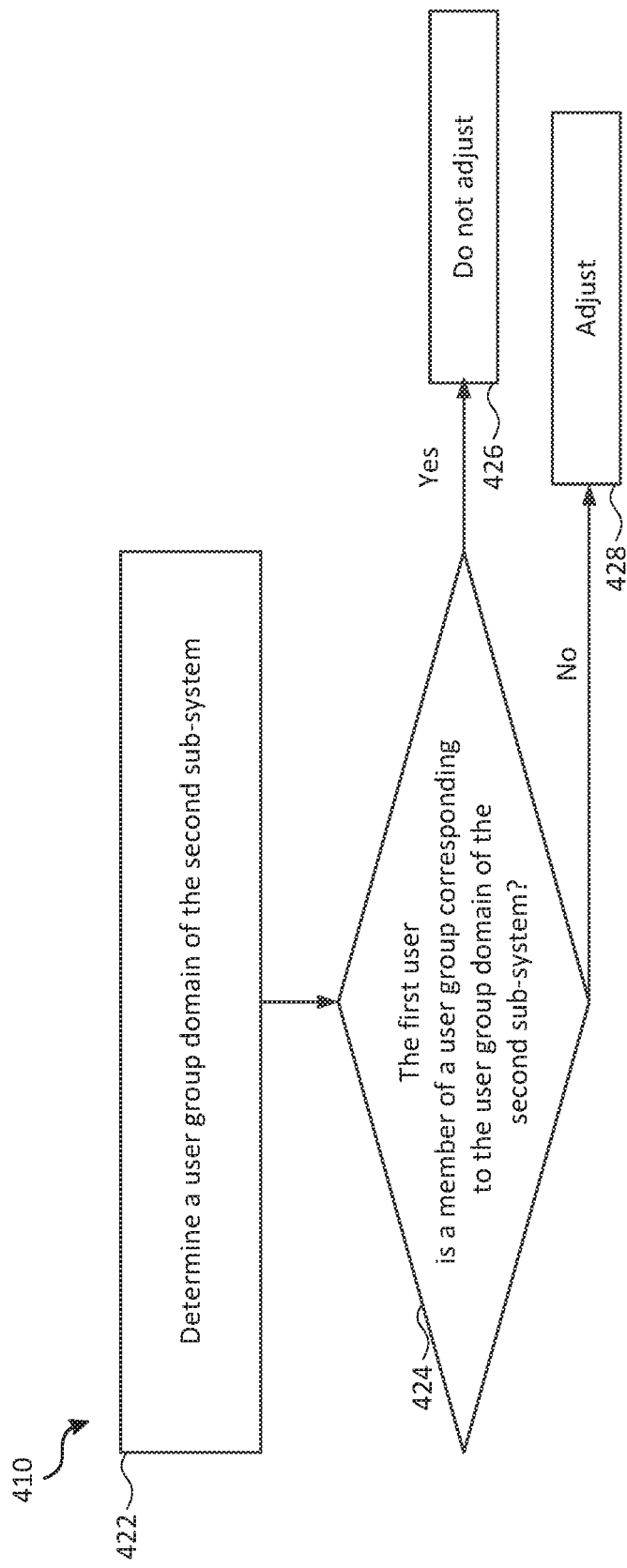

With reference to FIG. 4B, at block 422, based on the user group domains assigned to the plurality of sub-systems of the hierarchical computing-resource system, a user group domain of the second sub-system is determined. As an example shown in FIG. 3C, it is determined that the user group domain assigned to sub-system 326 is domain 340 (e.g., a domain associated with a user group of the service provider). At block 424, based on the group membership associated with the first user, it is determined whether the first user is a member of a user group corresponding to the user group domain of the second sub-system. In the example shown in FIG. 3C, based on the group membership of user T1, it is determined whether user T1 is a member of a user group corresponding to user group domain 330. At block 426, if it is determined that user T1 is a member of a user group corresponding to user group domain 330, no adjustment of the role-based access setting is required. At block 428, if it is determined that first user (e.g., user T1) is not a member of the user group corresponding to the user group domain (e.g., domain 330) of the second sub-system (e.g., sub-system 326), it is determined that the first user's access settings with respect to the second sub-system are to be adjusted.

With reference back to FIG. 4A, at block 412, if it is determined that first user is not a member of the user group corresponding to the user group domain of the second sub-system, the first user's role-based access settings propagated to the second sub-system are adjusted. For example, as illustrated in FIG. 3C, user T1's access privileges to sub-system 326 are revoked.

At block 414, if it is determined that first user is a member of the user group corresponding to the user group domain of the second sub-system, the first user's role-based access settings propagated to the second sub-system are not adjusted.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for providing hybrid access control in a cloud-services computing environment, the method comprising:
    at one or more computing systems operating in the cloud-services computing environment having one or more processors and memory:
    obtaining access control settings associated with a hierarchical computing resource system, wherein the access control settings include at least a first user's role based access settings defining access rights with respect to a first sub-system of the hierarchical computing-resource system;
    determining the access control settings from the first sub-system that are to be hierarchically propagated to a second sub-system of the hierarchical computing-resource system, wherein the second sub-system is a child sub-system of the first sub-system;
    obtaining user group domains assigned correspondingly to sets of sub-systems from a plurality of sub-systems of the hierarchical computing-resource system, the plurality of sub-systems including the first sub-system and the second sub-system, wherein the user group domains include a first user group domain assigned to the first sub-system and not to the second sub-system and a second user group domain assigned to the second sub-system and not to the first sub-system, wherein the first user group domain is associated with a tenant of the cloud-services computing environment, and the second user group domain is associated with the service provider of the cloud-services computing environment, obtaining user group domains comprising:
    receiving domain data representing the user group domains associated with the hierarchical computing-resource system; and
    annotating the plurality of sub-systems of the hierarchical computing-resource system with the domain data;
    obtaining a tenant group membership associated with the first user;
    determining that the first user is assigned to the first user group domain, based on the obtained tenant group membership associated with the first user;
    determining, based on the obtained user group domains and the obtained tenant group membership associated with the first user, whether the first user's role-based access settings to be hierarchically propagated from the first sub-system to the second sub system are to be adjusted; and
    in accordance with a determination that the first user's role-based access settings to be hierarchically propagated to the second sub-system are to be adjusted, adjusting the first user's role-based access settings propagated to the second sub-system such that adjusted first user's role-based access settings provided to the second sub-system no longer allow access to the second sub-system based on determining that the first user is not a member of a service provider group membership corresponding to the second user group domain assigned to the second sub-system.

2. The method of claim 1, wherein the first user's role-based access settings with respect to the first sub-system comprises:
    a system administrator's access settings; or
    a restricted user's access settings.

3. The method of claim 1, wherein the first sub-system is associated with a first hierarchy of the hierarchical computing-resource system; and wherein the second sub-system is associated with a second hierarchy of the hierarchical computing-resource system, the first hierarchy being a parent hierarchy of the second hierarchy.

4. The method of claim 3, wherein propagating the access control settings from the first sub-system to the second sub-system comprises:
    determining a relation between the first sub-system and the second sub-system; and assigning, based on the determined relation between the first sub-system and the second sub-system, the first user's role-based access settings with respect to the second sub-system.

5. The method of claim 1, wherein the first sub-system is a root sub-system associated with a hierarchy that has no parent hierarchy.

6. The method of claim 1, wherein at least one sub-system of the plurality of sub-systems includes one or more of file systems, applications, and computing resources provided by one or more virtual machines.

7. The method of claim 1, wherein annotating the plurality of sub-systems of the hierarchical computing-resource system with the domain data comprises:
    annotating the first sub-system of the hierarchical computing-resource system with the first user group domain; and
    annotating the second sub-system of the hierarchical computing-resource system with the second user group domain, the second user group domain being different from the first user group domain.

8. The method of claim 7, wherein the first user group domain includes a plurality of sub-user group domains, further comprising:
    propagating the access control settings from the first sub-system to one or more additional sub-systems of the of the hierarchical computing-resource system;
    determining, based on the access control settings propagated to the one or more additional sub-systems, the first user's role-based access settings with respect to the one or more additional sub-systems;
    annotating the one or more additional sub-systems with the corresponding sub-user group domains of the first user group domain; and
    determining, based on the annotations of the one or more additional sub-systems and based on the tenant group membership associated with the first user, whether the first user's role-based access settings with respect to the one or more additional sub-systems are to be adjusted.

9. The method of claim 1, wherein determining whether the first user's role-based access settings propagated to the second sub-system are to be adjusted comprises:
    determining, based on the user group domains assigned to the plurality of sub-systems of the hierarchical computing-resource system, a user group domain of the second sub-system being the second user group domain;

determining, based on the tenant group membership associated with the first user, whether the first user is a member of a user group corresponding to the user group domain of the second sub-system; and in accordance with a determination that first user is not a member of the user group corresponding to the user group domain of the second sub-system, determining that the first user's access settings with respect to the second sub-system are to be adjusted.

10. The method of claim 1, wherein adjusting the first user's role-based access settings propagated to the second sub-system comprises:

revoking at least one of the first user's access privileges with respect to the second sub-system.

11. The method of claim 1, further comprising:

receiving, from the first user, a request to access the second sub-system of the hierarchical computing-resource system;

determining, based on the adjusted first user's role-based access settings with respect to the second sub-system, whether the first user's access privileges with respect to the second sub-system are revoked; and in accordance with a determination that the first user's access privileges are revoked, denying the first user's request to access the second sub-system.

12. A host computing device operating in the cloud-services computing environment, the host computing device comprising:

one or more processors; and memory storing one or more programs configured to be executed by the one or more processors, the one or more programs including instructions for:

obtaining access control settings associated with a hierarchical computing resource system, wherein the access control settings include at least a first user's role based access settings defining access rights with respect to a first sub-system of the hierarchical computing-resource system;

determining the access control settings from the first sub-system that are to be hierarchically propagated to a second sub-system of the hierarchical computing-resource system, wherein the second sub-system is a child sub-system of the first sub-system;

obtaining user group domains assigned correspondingly to sets of sub-systems from a plurality of sub-systems of the hierarchical computing-resource system, the plurality of sub-systems including the first sub-system and the second sub-system, wherein the user group domains include a first user group domain assigned to the first sub-system and not to the second sub-system and a second user group domain assigned to the second sub-system and not to the first sub-system, wherein the first user group domain is associated with a tenant of the cloud-services computing environment, and the second user group domain is associated with the service provider of the cloud-services computing environment;

obtaining user group domains comprising:

receiving domain data representing the user group domains associated with the hierarchical computing-resource system; and annotating the plurality of sub-systems of the hierarchical computing-resource system with the domain data;

obtaining a tenant group membership associated with the first user;

determining that the first user is assigned to the first user group domain, based on the obtained tenant group membership associated with the first user;

determining, based on the obtained user group domains and the obtained tenant group membership associated with the first user, whether the first user's role-based access settings to be hierarchically propagated from the first sub-system to the second sub-system are to be adjusted; and in accordance with a determination that the first user's role-based access settings to be hierarchically propagated to the second sub-system are to be adjusted, adjusting the first user's role-based access settings propagated to the second sub-system such that adjusted first user's role-based access settings provided to the second sub-system no longer allow access to the second sub-system based on determining that the first user is not a member of a service provider group membership corresponding to the second user group domain assigned to the second sub-system.

13. The host computing device of claim 12, wherein annotating the plurality of sub-systems of the hierarchical computing-resource system with the domain data comprises:

annotating the first sub-system of the hierarchical computing-resource system with the first user group domain; and annotating the second sub-system of the hierarchical computing-resource system with the second user group domain, the second user group domain being different from the first user group domain.

14. The host computing device of claim 13, wherein the first user group domain includes a plurality of sub-user group domains, further comprising:

propagating the access control settings from the first sub-system to one or more additional sub-systems of the of the hierarchical computing-resource system;

determining, based on the access control settings propagated to the one or more additional sub-systems, the first user's role-based access settings with respect to the one or more additional sub-systems;

annotating the one or more additional sub-systems with the corresponding sub-user group domains of the first user group domain; and determining, based on the annotations of the one or more additional sub-systems and based on the tenant group membership associated with the first user, whether the first user's role-based access settings with respect to the one or more additional sub-systems are to be adjusted.

15. The host computing device of claim 12, wherein determining whether the first user's role-based access settings propagated to the second sub-system are to be adjusted comprises:

determining, based on the user group domains assigned to the plurality of sub-systems of the hierarchical computing-resource system, a user group domain of the second sub-system system being the second user group domain;

determining, based on the tenant group membership associated with the first user, whether the first user is a member of a user group corresponding to the user group domain of the second sub-system; and in accordance with a determination that first user is not a member of the user group corresponding to the user group domain of the second sub-system, determining that the first user's access settings with respect to the second sub-system are to be adjusted.

16. The host computing device of claim 12, wherein adjusting the first user's role-based access settings propagated to the second sub-system comprises:

revoking at least one of the first user's access privileges with respect to the second sub-system.

17. The host computing device of claim 12, wherein the one or more programs include further instructions for:
   receiving, from the first user, a request to access the second sub-system of the hierarchical computing-resource system;
   determining, based on the adjusted first user's role-based access settings with respect to the second sub-system, whether the first user's access privileges with respect to the second sub-system are revoked; and
   in accordance with a determination that the first user's access privileges are revoked, denying the first user's request to access the second sub-system.

18. A non-transitory computer-readable storage medium storing one or more programs configured to be executed by a host computing device operating in a cloud services computing environment having one or more processors and memory, the one or more programs including instructions for:
   obtaining access control settings associated with a hierarchical computing resource system, wherein the access control settings include at least a first user's role based access settings defining access rights with respect to a first sub-system of the hierarchical computing-resource system;
   determining the access control settings from the first sub-system that are to be hierarchically propagated to a second sub-system of the hierarchical computing-resource system, wherein the second sub-system is a child sub-system of the first sub-system;
   obtaining user group domains assigned correspondingly to sets of sub-systems from a plurality of sub-systems of the hierarchical computing-resource system, the plurality of sub-systems including the first sub-system and the second sub-system, wherein the user group domains include a first user group domain assigned to the first sub-system and not to the second sub-system and a second user group domain assigned to the second sub-system and not to the first sub-system, wherein the first user group domain is associated with a tenant of the cloud-services computing environment, and the second user group domain is associated with the service provider of the cloud-services computing environment, obtaining user group domains comprising:
   receiving domain data representing the user group domains associated with the hierarchical computing-resource system; and
   annotating the plurality of sub-systems of the hierarchical computing-resource system with the domain data;
   obtaining a tenant group membership associated with the first user;
   determining that the first user is assigned to the first user group domain, based on the obtained tenant group membership associated with the first user;
   determining, based on the obtained user group domains and the obtained tenant group membership associated with the first user, whether the first user's role-based access settings to be hierarchically propagated from the first sub-system to the second sub system are to be adjusted; and
   in accordance with a determination that the first user's role-based access settings to be hierarchically propagated to the second sub-system are to be adjusted, adjusting the first user's role-based access settings propagated to the second sub-system such that adjusted first user's role-based access settings provided to the second sub-system no longer allow access to the second sub-system based on determining that the first user is not a member of a service provider group membership corresponding to the second user group domain assigned to the second sub-system.

19. The computer-readable storage medium of claim 18, wherein annotating the plurality of sub-systems of the hierarchical computing-resource system with the domain data comprises:
   annotating the first sub-system of the hierarchical computing-resource system with the first user group domain; and
   annotating the second sub-system of the hierarchical computing-resource system with the second user group domain, the second user group domain being different from the first user group domain.

20. The computer-readable storage medium of claim 19, wherein the first user group domain includes a plurality of sub-user group domains, further comprising:
   propagating the access control settings from the first sub-system to one or more additional sub-systems of the of the hierarchical computing-resource system;
   determining, based on the access control settings propagated to the one or more additional sub-systems, the first user's role-based access settings with respect to the one or more additional sub-systems;
   annotating the one or more additional sub-systems with the corresponding sub-user group domains of the first user group domain; and
   determining, based on the annotations of the one or more additional sub-systems and based on the tenant group membership associated with the first user, whether the first user's role-based access settings with respect to the one or more additional sub-systems are to be adjusted.

21. The computer-readable storage medium of claim 18, wherein determining whether the first user's role-based access settings propagated to the second sub-system are to be adjusted comprises:
   determining, based on the user group domains assigned to the plurality of sub-systems of the hierarchical computing-resource system, a user group domain of the second sub-system system being the second user group domain;
   determining, based on the tenant group membership associated with the first user, whether the first user is a member of a user group corresponding to the user group domain of the second sub-system; and
   in accordance with a determination that first user is not a member of the user group corresponding to the user group domain of the second sub-system, determining that the first user's access settings with respect to the second sub-system are to be adjusted.

22. The computer-readable storage medium of claim 18, wherein adjusting the first user's role-based access settings propagated to the second sub-system comprises:
   revoking at least one of the first user's access privileges with respect to the second sub-system.

23. The computer-readable storage medium of claim 18, wherein the one or more programs include further instructions for:
   receiving, from the first user, a request to access the second sub-system of the hierarchical computing-resource system;
   determining, based on the adjusted first user's role-based access settings with respect to the second sub-system, whether the first user's access privileges with respect to the second sub-system are revoked; and in accordance with a determination that the first user's access privileges are revoked, denying the first user's request to access the second sub-system.

* * * * *